United States Patent [19]
McGowin et al.

[11] Patent Number: 5,822,974
[45] Date of Patent: Oct. 20, 1998

[54] HYBRID BIOMASS AND NATURAL GAS/OIL POWER GENERATION SYSTEM

[75] Inventors: Charles R. McGowin, Carmel; Jane H. Turnbull, Los Altos; Shelton Ehrlich, Palo Alto, all of Calif.

[73] Assignee: Electric Power Research Inst., Palo Alto, Calif.

[21] Appl. No.: 797,187

[22] Filed: Feb. 11, 1997

[51] Int. Cl.$^6$ .................................................. F02C 6/00
[52] U.S. Cl. ........................................ 60/39.182; 60/676
[58] Field of Search .......................... 60/39.182, 39.464, 60/676; 110/234, 216, 254

[56] References Cited

U.S. PATENT DOCUMENTS

| | | | |
|---|---|---|---|
| 4,414,813 | 11/1983 | Knapp | 60/39.182 |
| 4,686,832 | 8/1987 | Miliaras | 60/676 |
| 4,745,868 | 5/1988 | Seabury | 110/234 |

*Primary Examiner*—Noah P. Kamen
*Attorney, Agent, or Firm*—Flehr Hohbach Test Albritton & Herbert LLP

[57] ABSTRACT

A hybrid biomass natural gas/oil power generator system includes a circulating fluidized bed boiler which burns, for example, wood chips, a combustion turbine driven mainly by natural gas and a steam turbine. The wood chip boiler has its hot flue gas utilized to provide both steam, hot water and hot air which is eventually used by the combustion turbine. This hot air is first humidified and then has its temperature raised to approximately the boiler temperature by passing it over or through hot solids obtained from the boiler. The filtered humid air is mixed with steam and combusted natural gas to drive the combustion turbine. Lastly the hot solids from the boiler are also used for drying the wood fed to the wood chip boiler.

5 Claims, 2 Drawing Sheets

HYBRID BIOMASS AND NATURAL GAS/OIL POWER GENERATION SYSTEM

The present invention is directed to a hybrid biomass and natural gas/oil power generation system and more specifically where the biomass is wood and a combustion turbine is gas fired.

BACKGROUND OF THE INVENTION

Efficient electricity production from a combination of biomass and natural gas has long been sought. In Knapp U.S. Pat. No. 4,414,813. It is stated that one of the problems of "low efficiency" results from the fact that much of the energy used to vaporize the water "in the wood or biomass cannot be recovered". The Knapp patent further discusses the use of a combustion turbine in a hybrid system and discusses a prior art "Solar Turbine International system" where the gas turbine or "combustion turbine" is fired directly with an internal combustor. Knapp states:

> The disadvantage of direct firing the turbine is that it must be fired with a clean burning fuel, such as natural gas or diesel fuel to prevent fouling, corrosion and erosion of the fueling blades. These fuels are expensive in the range of $3–7/MBtu. No gas turbines in constant commercial use utilize furnace flue gases or biomass combustion gases because of their entrained contaminants. Although it is possible to clean such gases the cost of cleaning and pressurizing the hot gases for direct turbine firing is not feasible economically. Additionally, problems which may occur in combusting biomass or other fuel could ruin turbine blading on a multimillion turbine in a matter of hours." (Column 4, lines 5–17.)

OBJECTS AND SUMMARY OF THE INVENTION

It is an object of the present invention to provide a more efficient hybrid biomass and natural gas/oil power generation system.

In accordance with the above object there is provided a hybrid biomass natural gas/oil power generation system having a combustion turbine (CT) with natural gas/oil as its major fuel and where the biomass is combusted to produce heat output including solids with a flue gas and where a steam turbine is driven by the heat output of both the combusted biomass and CT. The system includes a boiler for the biomass producing the heated flue gas with solids. Separator means are connected to the boiler for separating the flue gas from the solids. Air is heated and humidified. Heater means receive the solids and pass the air therethrough for heating. Filter means are connected to the heater means for filtering corrosive particles from the heated and humidified air and supplying such air to the CT in combination with the natural gas/oil.

DESCRIPTION OF PREFERRED EMBODIMENT

Figure 1:
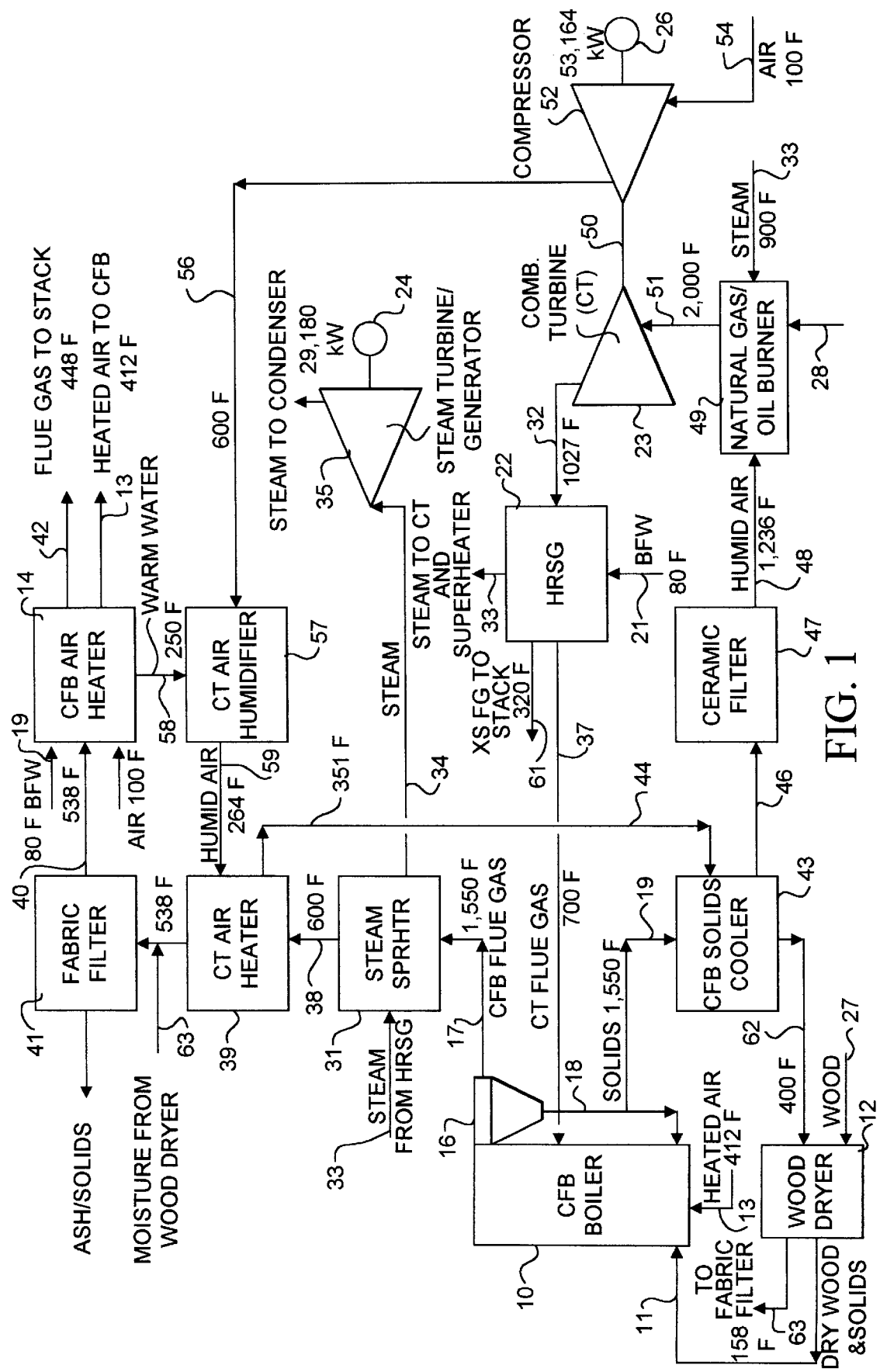
FIG. 1 is a block diagram illustrating the present invention.

The main component in the biomass system of the present invention is, of course, a circulating fluidized bed combustor (CFB boiler) set to operate at a temperature of approximately 1550°. It has as an input at 11 dry wood and solids from a wood dryer 12 and then heated air at 13 which is heated in a CFB air heater 14. The biomass in this case is wood chips. It could be another form of wood, lignite or other types biomass materials. The temperature of the boiler 10 is adjusted so that it does not exceed 1550° since this is the temperature at which the undesirable alkali materials produced by the combustion are vaporized. By maintaining the temperature below 1550° this material is still in particulate form and may be separated or filtered out. Although the circulating fluidized bed boiler or combustor is preferred slower speed boilers such as a bubbling bed combustor may be suitable.

The output of boiler 10 goes to a cyclone separator 16 and has two outputs; one of flue gas at output line 17 and a solids output on line 18. The approximate temperature of both of these outputs is 1550° F.

All of the temperatures and pressures indicated in FIG. I are approximate and theoretically calculated for one type of hybrid biomass natural gas system. The parameters of this system are a boiler feed water (BFW) input of 3000 lb. mole/hr on line 19 to CFB air heater 14. Power obtained from the two electrical generators 24 and 26 is a total gross output of 82,334 Kw. This is derived from an input of 110,972 pounds/hour of wood at 40% moisture input 27 to wood drier 12) and 11,233 lbs/hour of natural gas indicated at 28 (oil is an obvious substitute). The net calculated thermal efficiency of this particular process with the above parameters is 32.5% with 67% of the power due to wood and 33% gas. It is believed that somewhat higher efficiencies are obtained if the water input is increased to 4500 lb. mole/hr. (for example, 33.9%). Any greater water input may prove theoretically unfeasible.

Now continuing with the flow path of the flue gas from the cyclone separators line 17 supplies a steam super heater 31, receives steam from the heat recovery steam generator (HRSG) 22 (which itself receives the exhaust flue gas from combustion turbine 23 on line 32). The output 34 of steam super heater 31 drives the steam turbine 35 which is the prime mover of generator 34.

The flue gas of course having lost a considerable amount of heat is coupled via line 38 (with an indicated temperature of 600° F.) to a combustion turbine air heater 39. Then through a fabric filter 41, ash/solids are removed. The remaining heat of the CFB flue gas is coupled on line 40 to CFB air heater 14 and then exhausted on line 42 to the stack at a temperature of about 448° F.

Thus in summary the hot flue gas when it exits the cyclone separator 16 on line 17 goes through three separate heat exchanger which ultimately will provide energy to drive either the combustion turbine 23 or the steam turbine 35. This, of course, enhances the system efficiency.

Now again referring to cyclone separator 16, its solids output on line 18 is partially returned to the boiler 10. But most of the solids on the line 19 are fed into a CFB solids cooler 43 which acts as a direct contact air heater. Preheated and humidified air on line 44 from combustion turbine air heater 39 (at an approximate temperature of approximately 351° F.) is circulated in direct contact with the solids for heating this air toward the combustion solids temperature. This heated and previously humidified air exits at approximately 1236° F. via line 4 and is cleaned of any particulate matter and corrosive alkali particles by the ceramic filter 47 (which, of course, must operate at temperatures below 1550° F.). Then this air is supplied at approximately 1236° F. to combustion turbine 23 through the natural gas or oil burner 49. Burner 49 combusts the natural gas or oil on line 28, together with the humid air on line 48 and recirculated steam on line 33 from the recovery steam generator 22. This combined input (air, steam, gas/oil) enters the combustion turbine at 51 at a temperature of about 2000° F.

The combustion turbine (CT) is linked to a compressor 52 by shaft 53 to also drive the electric generator 56. The ambient air input 54 is compressed by the compressor 52 and passed via line 56 to the combustion turbine air humidifier 57 where heated water from CFB air heater 14 entering on line 58 is evaporated into the compressed air stream. The combined output of heated and humidified air passes via line 59 to the combustion turbine air heater 39 and returns to the combustion turbine on line 44 via the CFB solids cooler 43 as discussed above.

The flue gas of the combustion turbine 23 after initially heating water to steam in heat recovery steam generator 22 is both recycled on line 37 to CFB boiler 10 and is exhausted to the stack on line 61.

One other important heat efficiency concept of the system is that the same solids in the CFB solids cooler 43 which have been used to directly heat CT air are used on line 62 to wood dryer 12 to dry the wood fuel. Any resulting gas from dryer 12 at a much lower temperature of 158° F. on line 63 is routed to the fabric filter 41 to be exhausted. Thus the solids obtained from the CFB boiler 10 transferred to cooler 43 are utilized both for supplying additional heat to the humidified air input to combustion turbine 23, thus increasing mass input to the turbine and its efficiency, and also to eliminate excess moisture from the wood fuel or other biomass fuel.

As an alternative to driving to the compressor 52 by combustion turbine 23, the compressor 52 could be driven by a separate electric motor which would allow greater flexibility in selecting the optimum CT speed.

Figure 2:
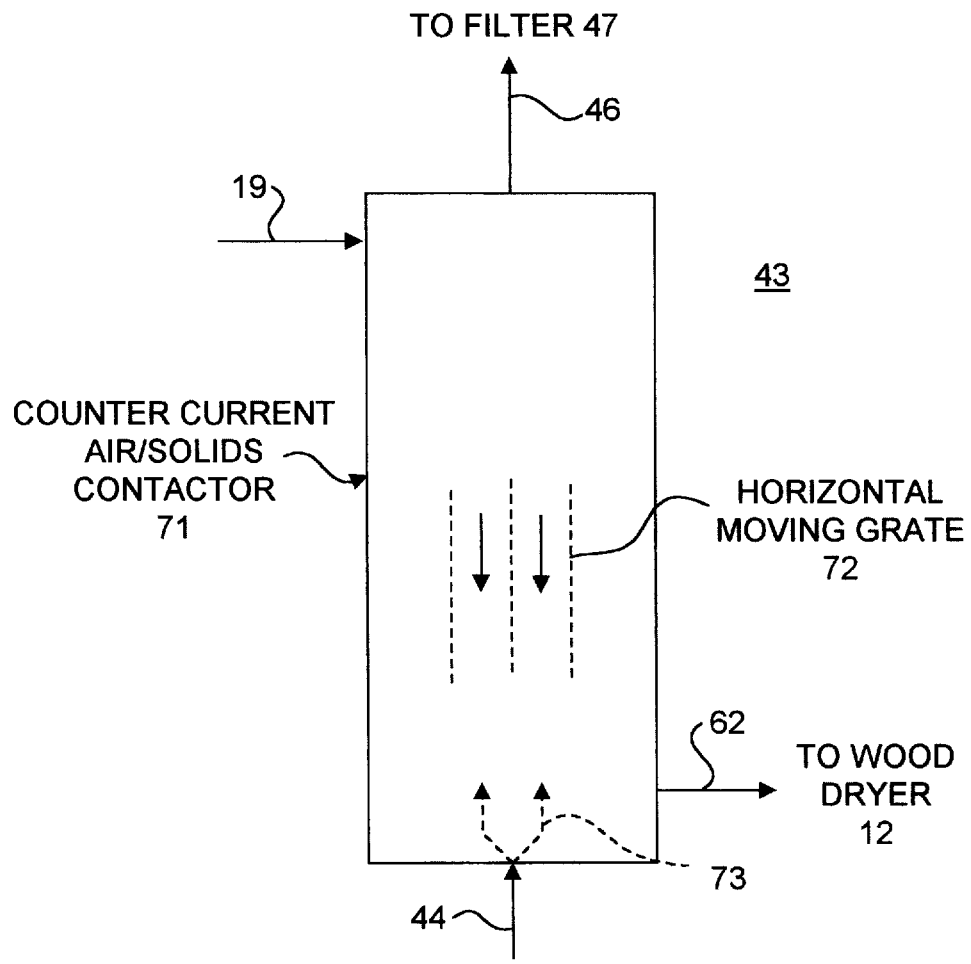
FIG. 2 is a detailed schematic showing of one of the blocks of FIG. 1.

FIG. 2 illustrates in detail a typical CFB solids cooler or heat exchanger 43 The unit consists of a vertical staged countercurrent flow contactor 71 to transfer heat from the hot solids leaving the CFB boiler on line 19 to the humid air leaving the CT air heater on line 44. This is followed by a filter 47 to remove the entrained solids from the air before it enters the CT combustor. The physical configuration of the countercurrent flow contactor 71 is a moving bed contactor 72, which uses a mechanical device such as a horizonal moving grate, rotary kiln, or other device to move the solids in the reverse direction to the air flow such that the hot solids entering contact the hot air leaving the contactor.

Thus a more efficient hybrid biomass and natural gas/oil power generation system has been provided.

What is claimed is:

1. In a hybrid biomass natural gas/oil power generation system having a combustion turbine (CT) with the natural gas/oil as its major fuel and where the biomass is combusted to produce a heat output including solids with a flue gas and where a steam turbine is driven by the heat output of both the combusted biomass and CT, the system including, a boiler for said biomass producing said heated flue gas with solids;

separator means connected with said boiler for separating said flue gas from said solids;

humidifying means for heating and humidifying air;

heater means for receiving said solids and passing said heated and humidified air therethrough for heating said air;

filter means connected to said heater means for filtering corrosive particles from said heated and humidified air and supplying said air to such CT in combination with said natural gas/oil.

2. A system as in claim 1 including a biomass dryer connected to said boiler and where said heater means also supplies heated air to said biomass dryer for drying said biomass.

3. A system as in claim 1 wherein the system is adapted to keep the temperature of said heated and humidified air at said filter means less than the vapor temperature of substantially 1500° F. of any alkali material in said air whereby vaporization of such alkali material is inhibited.

4. A system as in claim 1 where said CT drives an air compressor whose air output supplies said humidifying means.

5. A system as in claim 1 further including a heat exchanger to transfer heat from said flue gas to said humidified air.

* * * * *